Nov. 21, 1950     R. C. ENGELHAUPT     2,531,262
PORTABLE FEEDING TROUGH
Filed Aug. 5, 1948
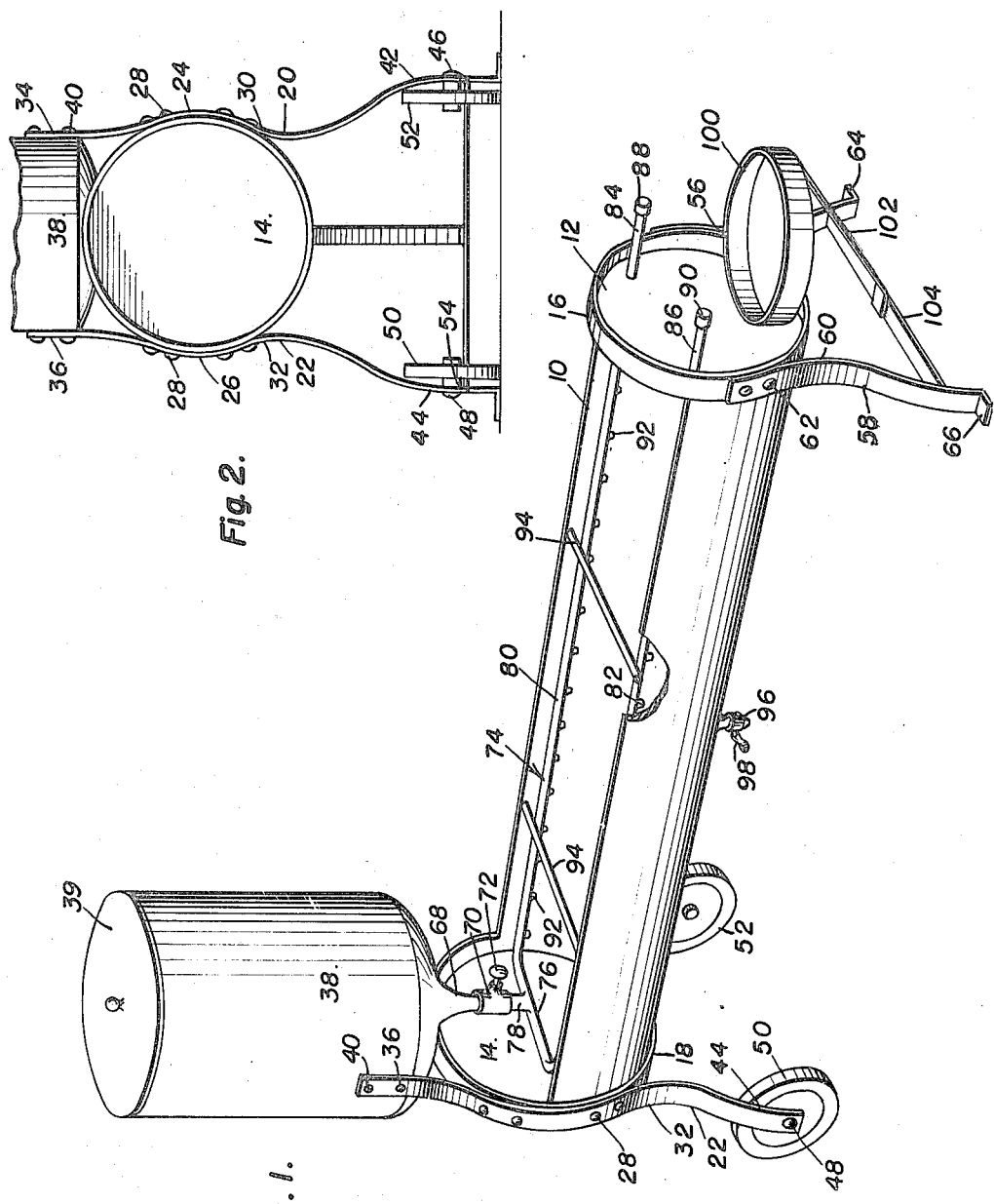
Robert C. Engelhaupt
INVENTOR.

Patented Nov. 21, 1950

2,531,262

UNITED STATES PATENT OFFICE 2,531,262

PORTABLE FEEDING TROUGH

Robert C. Engelhaupt, Bonesteel, S. Dak.

Application August 5, 1948, Serial No. 42,603

2 Claims. (Cl. 119—53)

This invention relates to a feeding device or trough for animals and has for its primary object to render more convenient and efficient the task of feeding and watering stock.

Another important object of this invention is to provide new and useful improvements in feeding troughs so that a more efficient feeding program can be inaugurated and beneficial results in the feeding of stock can be realized both by way of a reduction in time and labor expended by a farmer and by way of a more content and satisfied stock.

In carrying out the above general aims and objects, meritorious structural features have been employed, such as, a pair of inwardly and outwardly bowed or spread standards carrying wheels at one end and serving to support one end of a feed trough and to mount a filling tank or hopper above the feed trough. Other meritorious features reside in the provision of an apertured distributing pipe system connected to a filling tank and disposed in the feeding trough so that the entire feeding trough is constantly filled with semi-liquid feed, such as milk, buttermilk, mush or the like.

These and ancillary objects and other meritorious features become more clearly apparent upon a perusal of the following specification, are attained by this invention, a preferred embodiment of which is set forth in the following description and illustrated in the accompanying drawing, wherein:

Figure 1 is a view in perspective of this invention, and;

Figure 2 is an elevational view of one end of this invention illustrating the means provided for imparting portability to the invention.

In the art of husbandry, it has been the practice to enclose certain stock, such as pigs, hogs or the like, in enclosures, commonly referred to as pens or sties. Disposed in the enclosures are feeding and watering troughs, which are convenient for use by the feeding animals but are burdensome for a farmer. In this respect, it is necessary for the farmer to physically or mechanically transport from a source point to the trough an appreciable amount of semi-liquid feed, such as buttermilk or sweetmilk, the attendant conveying of the feed necessitating a considerable expenditure of time and labor. To obviate this outstanding defect in the field of husbandry is the primary purpose of the instant invention. This is accomplished by providing a mobile feeding device, which includes a feeding trough easily accessible for use by the stock and a regulated and controlled supply tank and filling system mounted on and carried unitarily by the feeding trough.

As can be appreciated, repetitious transporting of feed from a supply source to a fixed feeding trough is obviated, since the feed trough carries its own supply source from point to point. And yet, the necessity of providing a separate feeding trough for each enclosure, various specie and types of stock being maintained in separate enclosures, is rendered obsolete, since the instant invention by the virtue of its portability, is easily and conveniently moved from enclosure to enclosure thereby enabling the entire stock to feed from the same trough. Not only does this result in a savings in time prior to and during the feeding program but also it is to be noted that only one trough needs to be cleaned and maintained in proper condition.

Paralleling the main purpose of this invention, as noted above, this invention insures a better fed stock, functioning to prevent "over-feeding," which is vital in the welfare of calves, due to the control and regulation means provided in the even distribution of the semi-liquid substance.

As illustrated in Figure 1 of the drawings, a conventional feeding trough 10 is provided and may be formed from any suitable material, such as sheet metal, wood and the like. The feeding trough may assume any desired size or shape, the only requisite being that the same should be of sufficient length to accommodate at its sides a number of animals. In this respect, the feeding trough is preferably of a length in excess of five feet. The depth of the trough should be comparatively shallow so that the interior of the trough can be conveniently reached by the stock, without injury being imparted to the stock. As depicted, the feeding trough is of a substantially U-shaped cross-sectional shape having a curved bottom wall and opposed side walls. The ends of the trough are closed by a circular end wall 12 disposed at one end and a similar end wall 14 disposed at the opposite end. The end wall 14 constitutes the front of the trough, while the end wall 12 is disposed at the rear end of the trough. The opposed end walls 12 and 14 are preferably circular and are secured to the ends of the trough. Circular rings or hoops 16 and 18 are secured to the ends of the trough 10 to diametrically reinforce the same. A pair of opposed standards or supporting legs or bars 20 and 22 are bowed or spread outwardly as at 24 and 26 to engage and fit snugly on the outer periphery of the hoop 18, as seen in Figure 2. The standards are riveted as at 28 or otherwise conventionally secured to the hoop. It is to be noted that the outwardly bowed portions 24 and 26 of the standards are inclined or curved inwardly as at 30 and 32 so that the trough in effect seats on the standards at one end and is supported thereby. The standards are extended upwardly in opposed vertical fashion and terminate in parallel ends 34 and 36 which serve to support a supply tank or hopper 38 having a lid 39. Conventional securing or attaching means, such as rivets 40 are employed for mounting the tank between the standard ends, as seen in Figure 2. The lower portions of the standards are extended outwardly from the supporting portions 30 and 32 and terminate in parallel substantially straight ends 42 and 44. The lower ends 42 and 44 of the standards are apertured to receive a pair of axles 46 and 48, which serve to rotatably mount the wheels 50 and 52 to the standards. Of course, conventional journal bearings 54 are employed to space the wheels from the ends of the standards.

The rear end of the trough is spaced from the ground and supported in a similar horizontal plane with the front end by means of the standards or legs 56 and 58. The standards 56 and 58 are inwardly bowed, as at 60, so that the end of the trough rests on and is supported by the curved portion of the standards. Rivets 62 are employed to secure the upper ends of the standards on the opposed sides of the end ring 16. The lower ends of the standards terminate in parallel fashion and have laterally extending stop plates 64 and 66 which function to prevent the penetration of the legs 56 and 58 into the ground, so that the trough is at all times maintained in a level horizontal position. The particular length of the standards is not considered important other than it is material that they be of a sufficient length to space the trough considerably above the ground to prevent poultry and smaller animals from having access to and polluting or spoiling the contents.

The supply tank or hopper 38, which is vertically disposed in an elevated fashion from the forward end of the trough terminates in a depending filling neck 68, having a T-shaped coupling 70 secured to the end thereof. The coupling 70 supports a conventional shut-off valve, which is actuated and controlled by a rotatable handle or wheel 72. A distributing system, 74, is operatively associated with the opposite end of the T-coupling 70 and conducts a semi-liquid feed from the tank to the trough. The distributing system 74 comprises a transverse pipe section 76, having an upstanding connection 78 which is received in a coupling 70. At each end of the transverse section 76 is an elongated distributing pipe 80 and 82. The pipes 80 and 82 are longitudinally disposed in the trough, adjacent the longitudinal side edges thereof and spaced a short distance below the side edges. The pipes 80 and 82 are disposed through the end wall 12 and extend outwardly therefrom terminating in handles 84 and 86 which are exteriorly threaded to receive drain caps 88 and 90. A plurality of longitudinally spaced downwardly disposed apertures 92 are provided so that the semi-liquid substance is evenly distributed throughout the length of the trough. This of course, insures an equal feeding of the stock disposed along the length of the trough. To further aid this purpose, a plurality of transverse partition rods 94 are disposed in longitudinal spacement in the trough.

To drain the trough for cleaning purposes or the like, a drain valve 96 depends from the bottom of the trough and is actuated by a handle 98, as is conventional.

To enable the farmer or stockman to provide minerals, such as salt or the like or similar substances to the stock, a mineral retaining pan 100 is laterally supported at the rear end of the trough and is mounted on a brace bar 102. The brace bar 102 is secured to a transverse slot or bar 104, so that the pan is maintained in a horizontal position projecting rearwardly from the rear portion of the trough.

It can be seen that the device is easily moved from point to point, along the feeding line, by grasping the handle extensions 84 and 86 and lifting the standards 56 and 58 out of ground engagement, with the device being moved by the wheels 50 and 52. Of course, during the movement of the device, the control valve for the tank will retain the heating substance in the tank and thus avoid any splashing and subsequent wasting of the feed disposed in the trough.

However, since many other modifications and purposes of this invention will become readily apparent to those skilled in the art upon a perusal of the foregoing description, it is to be understood that certain changes in style, size and components may be effected without a departure from the spirit of the invention and within the scope of the appended claims.

Having described the invention, what is claimed as new is:

1. A feeding trough comprising an elongated U-shaped body, opposed end walls on said body, opposed standards medially secured to the body adjacent one of the end walls, wheels journalled on the lower ends of the standards, a filling tank mounted between the upper ends of the standards, perforated pipes connected at one end to said tank and longitudinally disposed in said body, the other ends of said pipes being extended through one of the end walls, drain caps detachably secured on the extended ends of said pipes and means for draining said body.

2. An animal feeding device comprising a trough having end walls, opposed standards medially secured to said trough adjacent one of said walls, wheels rotatably journaled on the lower ends of said standards, a liquid reservoir mounted between the upper ends of the standards and disposed above the trough, perforated pipes connected at one of their ends to said reservoir, valve means associated with said pipes, the pipes being disposed longitudinally in the trough adjacent the upper open end thereof, and extending beyond the other end wall, said extending ends of the pipes being closed and vertically depending legs secured to the last named end wall.

ROBERT C. ENGELHAUPT.

REFERENCES CITED

The following references are of record in the file of this patent:

UNITED STATES PATENTS

| Number | Name | Date |
|---|---|---|
| 198,564 | Bryan | Dec. 25, 1877 |
| 577,699 | Weaver et al. | Feb. 23, 1897 |
| 1,086,513 | Clarke | Feb. 10, 1914 |
| 1,340,085 | Siebring | May 11, 1920 |
| 1,522,084 | Swearingen | Jan. 6, 1925 |
| 1,816,684 | Liechty | July 28, 1931 |
| 1,896,615 | Gibbs | Feb. 7, 1933 |
| 2,290,042 | Granville | July 14, 1942 |